United States Patent
Ng

(10) Patent No.: US 8,121,485 B2
(45) Date of Patent: Feb. 21, 2012

(54) RF-PHOTONIC TRANSVERSAL FILTER METHOD AND APPARATUS

(75) Inventor: Willie W. Ng, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 65 days.

(21) Appl. No.: 12/556,527

(22) Filed: Sep. 9, 2009

(65) Prior Publication Data

US 2010/0028012 A1 Feb. 4, 2010

Related U.S. Application Data

(62) Division of application No. 11/478,402, filed on Jun. 28, 2006, now Pat. No. 7,627,253.

(51) Int. Cl.
*H04J 14/02* (2006.01)
*H04B 10/00* (2006.01)

(52) U.S. Cl. ............. 398/85; 398/102; 398/53; 398/161

(58) Field of Classification Search ................... 398/79, 398/82, 85, 87, 95, 102, 161, 183, 186, 187, 398/198, 53
See application file for complete search history.

(56) References Cited

U.S. PATENT DOCUMENTS

| | | | |
|---|---|---|---|
| 5,555,119 A | 9/1996 | Lewis | |
| 6,356,371 B1 | 3/2002 | Chiaroni et al. | |
| 6,839,521 B2 | 1/2005 | Davis | |
| 6,888,982 B2 * | 5/2005 | Hayes | 385/32 |
| 7,239,809 B2 * | 7/2007 | Pescod | 398/87 |
| 2002/0071155 A1 * | 6/2002 | Inada et al. | 359/124 |
| 2003/0147653 A1 | 8/2003 | Pescod | |
| 2005/0094928 A1 * | 5/2005 | Ng et al. | 385/15 |

OTHER PUBLICATIONS

Peter Lynch, "The Dolph-Chebyshev Window: A Simple Optimal Filter," *Monthly Weather Review*, Apr. 1997, pp. 655-660, vol. 125, American Meteorological Society.

B. Vidal, et al., "Efficient Architecture for WDM Photonic Microwave Filters," *IEEE Photonics Technology Letters*, Jan. 2004, pp. 257-259, vol. 16, No. 1, IEEE.

Notice of Allowance dated Jul. 27, 2010, for related U.S. Appl. No. 11/478,402.

* cited by examiner

*Primary Examiner* — M. R. Sedighian
(74) *Attorney, Agent, or Firm* — Christie, Parker, Hale

(57) ABSTRACT

A method and apparatus for implementing an RF photonic transversal filter that utilizes tap apodization and wavelength reuse to obtain a high side lobe suppression together with narrow and configurable passbands. Several taps are obtained from one wavelength by using dispersive optical delay lines such as chirped fiber gratings that introduce a delay between successive wavelengths. A selected subset of the input wavelengths is utilized to generate multiple taps per wavelength. Some of the taps are apodized to generate various filter transfer functions that yield a high side lobe suppression ratio.

8 Claims, 14 Drawing Sheets

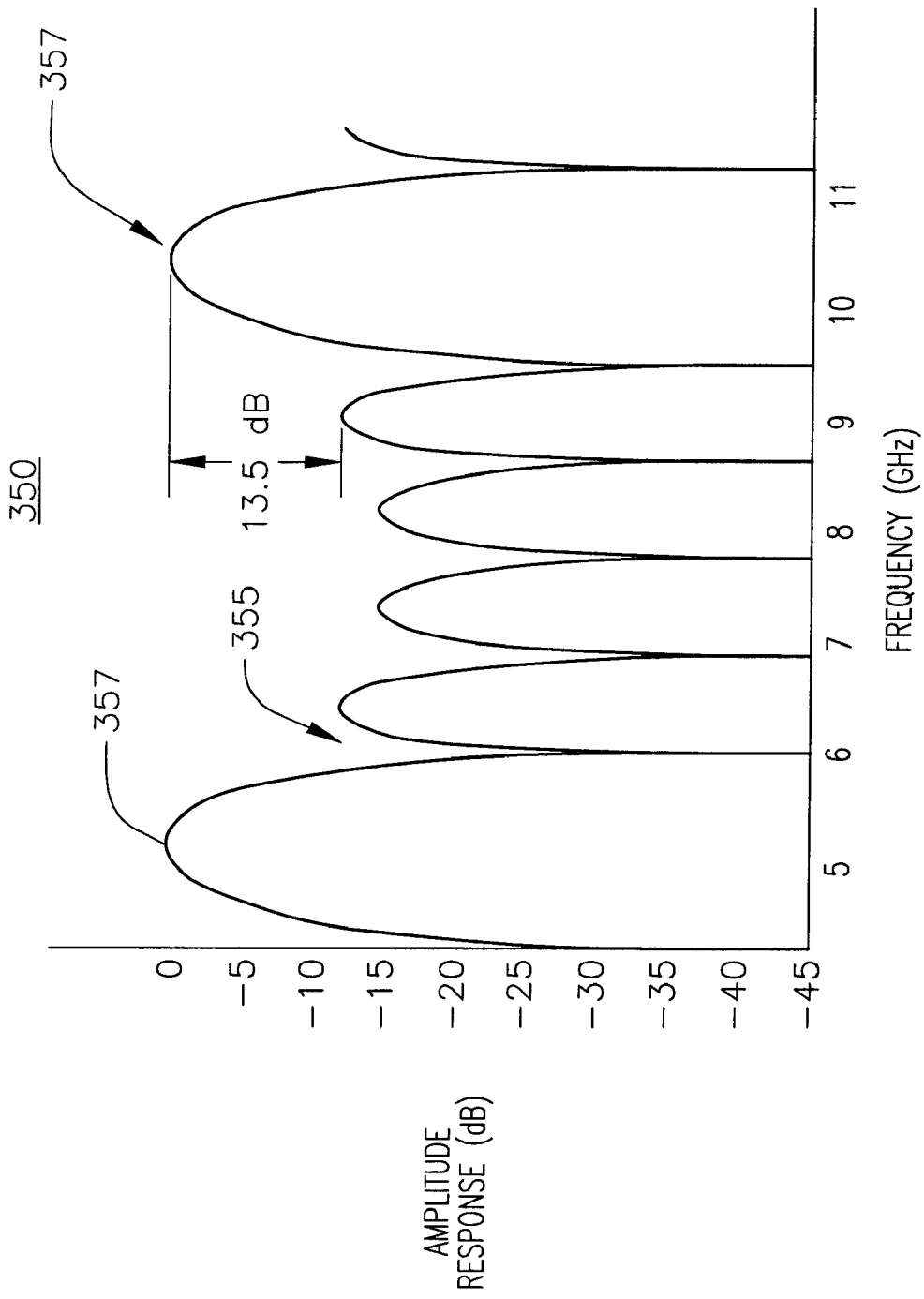

RF-PHOTONIC TRANSVERSAL FILTER METHOD AND APPARATUS

CROSS-REFERENCE TO RELATED APPLICATION(S)

This application is a divisional of U.S. application Ser. No. 11/478,402, filed Jun. 28, 2006, now U.S. Pat. No. 7,627,253, issued Dec. 1, 2009, the entire content of which is incorporated herein by reference.

BACKGROUND OF THE INVENTION (a) Field of the Invention

The present invention relates to photonic transversal filters and more particularly to photonic transverse filters employing wavelength reuse to increase the number of taps and therefore the accuracy of the filters when apodized filter taps are being used for increasing the suppression of the filtered response amplitude at undesirable frequencies around the passband.

(b) Description of the Related Art

Photonic links are commonly used for signal distribution in antenna systems. It has also been established that RF-photonic links in so called fiber-radio networks have tremendous commercial potential for distributing microwave signals, especially those at mm-wave frequencies, between the base-station of a wireless network and the remoted sites of transmit/receive antennas.

In general, RF-photonic transversal filters enable one to accomplish an assortment of signal processing functions for microwave signals that have been modulated on optical carriers, as in fiber-remoted antenna systems. Transversal filters are finite impulse response (FIR) digital filters where for an impulse function input the filter response is finite and eventually dies down to zero. FIR filters are inherently stable, require no feedback, and can have linear phase.

The RF-photonic transversal filters can, for example, enhance the signal to noise ratio (SNR) in the receive chain of a multifunction antenna, while rejecting undesirable interferers or spurs. In these antenna systems, one exploits the broadband modulation capabilities of photonics to distribute the RF received at the sensor aperture to multiple locations, e.g. radar receivers or communications receivers, for further processing. Wavelength division multiplexing (WDM) laser-sources used to form the filters and microwave receivers are typically located in a secure (or benign) environment, while the optical modulator is mounted at the sensor aperture. As part of the antenna-remoting system, these filters serve to select a desired frequency segment of the RF modulated on the optical carrier, before it is distributed to an appropriate microwave receiver. Because each of these receivers is typically designed to cover a specific microwave band, for example the L-band that ranges from 1 to 2.6 GHz, acquiring more flexibility to reconfigure the filter's center frequency and passband width would enhance its signal processing versatility.

In addition, many of the signal processing algorithms, for example, ones that utilize digital signal processing DSP, employed in the microwave receivers are only exercised over relatively narrow frequency spans of, for example, less than 500 MHz. An agile RF-photonic filter with a sufficiently narrow passband can enable one to track a received signal with improved SNR over the small operation bandwidth of the digital processor. In order to achieve a narrow passband, a high side lobe suppression ratio (SLSR) is desirable that distinguishes the passband by suppressing the side lobes of the filter well below the −1 dB bandwidth of the passband.

Filter coefficients or filter taps of a photonic filter are obtained from wavelengths input to the filter. The wavelengths correspond to waves generated by single frequency laser sources whose outputs are input to the WDM of the filter. The larger the number of the wavelengths input to the filter, the larger the number of the taps produced by the filter, the narrower the passbands of the filter, and the higher the accuracy of the filter. However, generating a large number of taps involves a large number of laser sources that each output a wave of a particular wavelength. Reducing the number of laser sources is desirable because it reduces the number of components required by the filter. Wavelength reuse allows a filter to use fewer number of laser sources and still obtain the same number of filter taps. However, the number of taps, and therefore wavelength reuse to generate a higher number of taps, do not impact side lobe suppression. Consequently, the SLSR attained via conventional schemes that utilize wavelength reuse is too small to be of practical interest in the above applications.

Therefore, there is a need to achieve high filter accuracy while simultaneously obtaining narrow passbands and large side lobe reduction.

SUMMARY OF THE INVENTION

One embodiment of the invention provides a method for photonic transversal filtering of an input RF signal. The method includes receiving a set of single frequency optical waves and the input RF signal, modulating amplitudes of the single frequency optical waves by the input RF signal, introducing primary time delays between the single frequency optical waves that have different frequencies, and forming a filtering function from the single frequency optical waves. The formation of the filtering function includes converting the single frequency optical waves into electrical signals for producing a filtered output RF signal corresponding to the input RF signal. The introduction of the primary time delays leaves the amplitudes of the single frequency optical waves substantially unchanged. The formation of the filtering function includes reusing at least one of single frequency optical waves. The formation of the filtering function includes apodizing the amplitudes of at least one of the single frequency optical waves.

Another embodiment provides an RF photonic transversal filter that includes an optical modulator for receiving a set of single frequency waves, an antenna coupled to the optical modulator for receiving an RF input and providing the RF input to the optical modulator, a circulator coupled to the optical modulator for receiving the set of single frequency waves modulated by the RF input, a dispersive optical delay coupled to the circulator for reflecting modulated single frequency waves while separating the modulated single frequency waves by introducing a time delay between reflected modulated single frequency waves, a first time delay element coupled to the circulator for receiving separated reflected modulated single frequency waves from the circulator and for delaying all of the separated reflected modulated single frequency waves by a first delay amount, an optical filter coupled to the circulator for receiving the separated reflected modulated single frequency waves from the circulator and passing through a subset of the separated reflected modulated single frequency waves, and a group of function forming operators each coupled to the optical filter. Each operator receives the subset from the optical filter and each operator generates an electrical signal. Each operator includes a second time delay element coupled to the optical filter for receiving the subset from the optical filter and delaying all members of the subset by a second delay amount, and an attenuator coupled to the second time delay element for attenuating amplitudes of all of the members by an attenuation factor, and photodetectors. Each photodetector is either coupled to the attenuator of one of the function forming operators for converting an attenuated amplitude of each one of the members of the subset into an electrical signal or coupled to the first time delay element for converting each delayed separated reflected modulated single frequency waves into an electrical signal. A sum of electrical signal outputs of the photodetectors forms a filtered RF output signal.

Accordingly, embodiments of this invention enable one to develop a reconfigurable RF-photonic filter that not only will support a large variation in passband width ($\Delta f$), but also can maintain a high SLSR as $\Delta f$ is varied. The passband variation attribute is due to the capability to generate multiple taps per wavelength, and the fact that $\Delta f$ is inversely related with the number of taps. The high SLSR attribute is due to the capability in the embodiments of the invention to control and taper amplitudes of the taps to obtain taps of varying amplitudes during the reuse of wavelengths for tap generation. Controlling and tapering the amplitudes of the taps is generally referred to as tap weight apodization. The tap weight apodization tapers the amplitudes of the taps to obtain taps that correspond to various functions such as the sin c function, the Chebyshev function, or the normal distribution function.

BRIEF DESCRIPTION OF THE DRAWINGS

FIG. 3C shows filter response obtained for uniform tap weights with 6 taps derived from 3 input wavelengths to the filter of FIG. 3A.

DETAILED DESCRIPTION OF THE INVENTION

Figure 1:
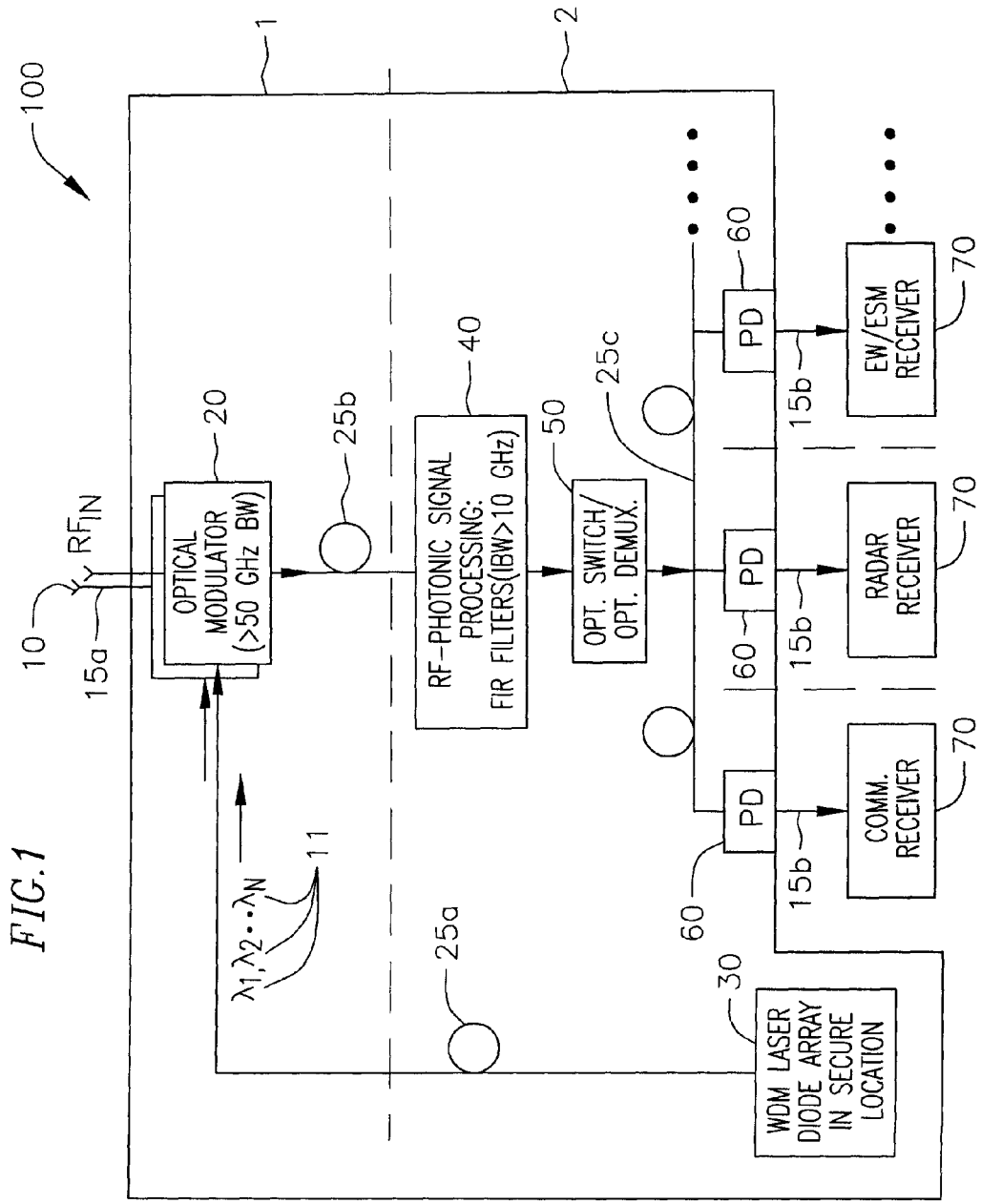
FIG. 1 shows an RF-photonic pre-filtering for fiber-remoted multifunction antenna system according to the embodiments of the invention.

FIG. 1 shows a fiber-remoted multifunction antenna system 100 that includes RF-photonic pre-filtering of the RF transmissions received before providing them for photodetection and conversion back to RF signals. Conversion of RF input into optical signals and performing the signal processing operations and subsequent transmissions in the optical domain helps more efficient processing and transfer of the signal because transmission of optical signals is far less lossy than RF and microwave transmission. Embodiments of the invention provide an efficient and accurate photonic pre-filtering scheme that may be used in the antenna system 100.

The antenna system 100 receives RF waves at an antenna located in area 1 that is not necessarily secure. Laser sources used to form an RF-photonic filter and microwave receivers utilizing the received, filtered and processed RF waves are typically located in a secure (or benign) environment 2. RF waves arrive at a remoted antenna 10 and are provided to an optical modulator 20. The optical modulator 20 may have a bandwidth of greater than 50 GHz or greater than 70 GHz. The optical modulator 20 may be an electro-optic modulator (EOM) or an electro-absorption modulator (EAM) or the like. A WDM diode array 30 located in the secure location 2 is coupled to the optical modulator 20. Optical carriers 11 of various wavelengths $\lambda_1 \ldots \lambda_n$ are provided from the WDM laser diode array 30 to the optical modulator 20 over a fiber optic line 25a coupling the laser diode array 30 to the optical modulator 20. At the optical modulator 20, the RF waves modulate each of the optical carriers 11. Each optical carrier 11, that is modulated by the optical modulator 20, enters the secure location 2 over the fiber optics line 25b.

In the secure location 2, the RF waves modulated on the optical carriers 11 enter an RF-photonic signal processing unit 40 that may include FIR filters. The FIR filters included in the signal processing unit 40 may have intermediate bandwidths (IBW) of greater than 10 GHz. The output of the FIR filters of the signal processing unit 40 is sent to an optical switch or optical demultiplexer 50 subject to schedule control. While optical transmission is typically efficient, transmission of microwave signals may be very lossy. Therefore, using the optical switch/demultiplexer 50 after the signals transmitted by optical transmission have been subject to signal processing at the RF photonic signal processing unit 40 conserves the energy of the signals. Optical transmission of the signals via optical paths 25c is distinguished in FIG. 1 from regular and typically lossy microwave transmission paths 15a.

The output of the optical demultiplexer 50 is sent over fiber to a number of photodetectors (PD) 60. The RF output of the PDs 60 that would be converted into microwave signals is sent via regular transmission paths 15b to various receivers 70. The receivers 70 may include communication receivers, electronic support measures receivers, radar receivers and the like. The antenna system 100 maintains the demultiplexing and routing to various receivers 70 within the more efficient optical domain and converts the optical signals back to RF signals only after demultiplexing at the optical switch and demultiplexer 50.

Figure 2A:
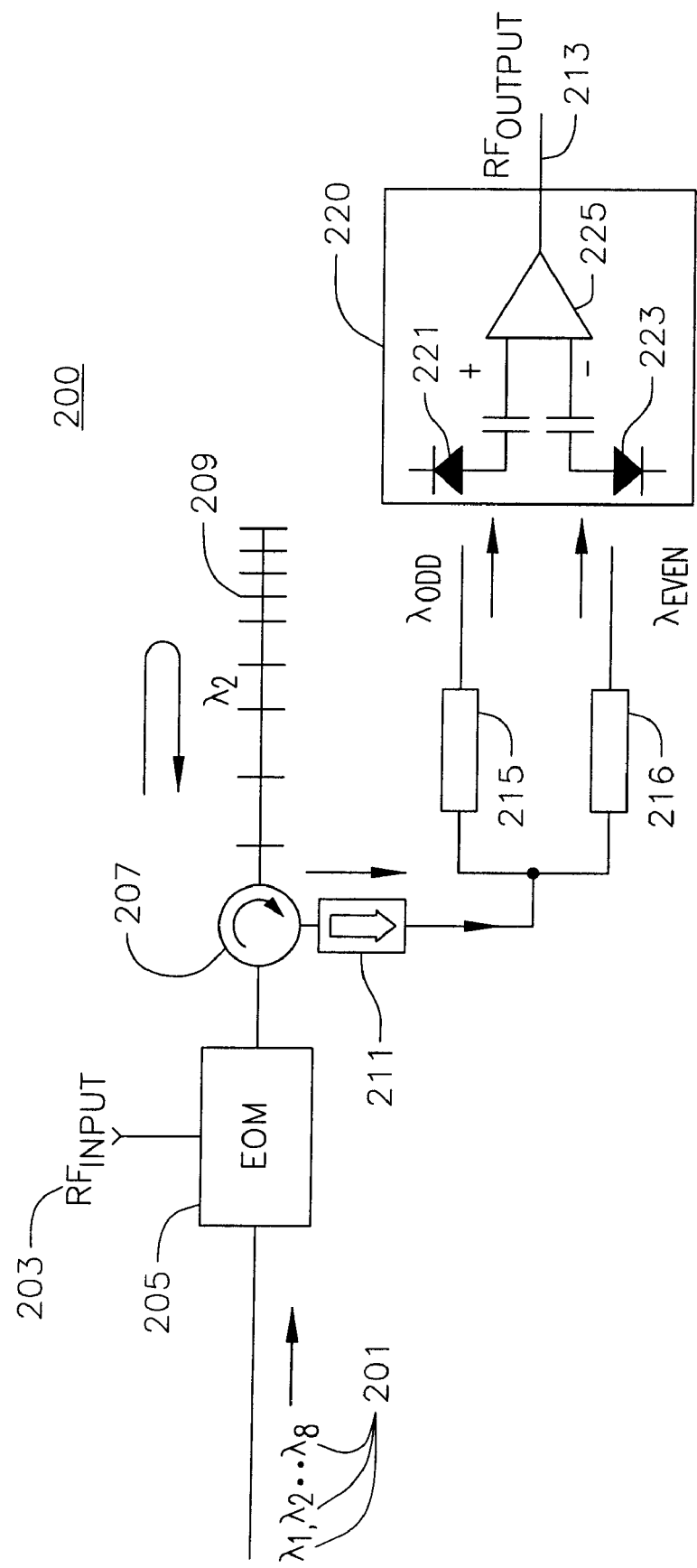
FIG. 2A shows a filter architecture that may be used in the system of FIG. 1.
Figure 3A:
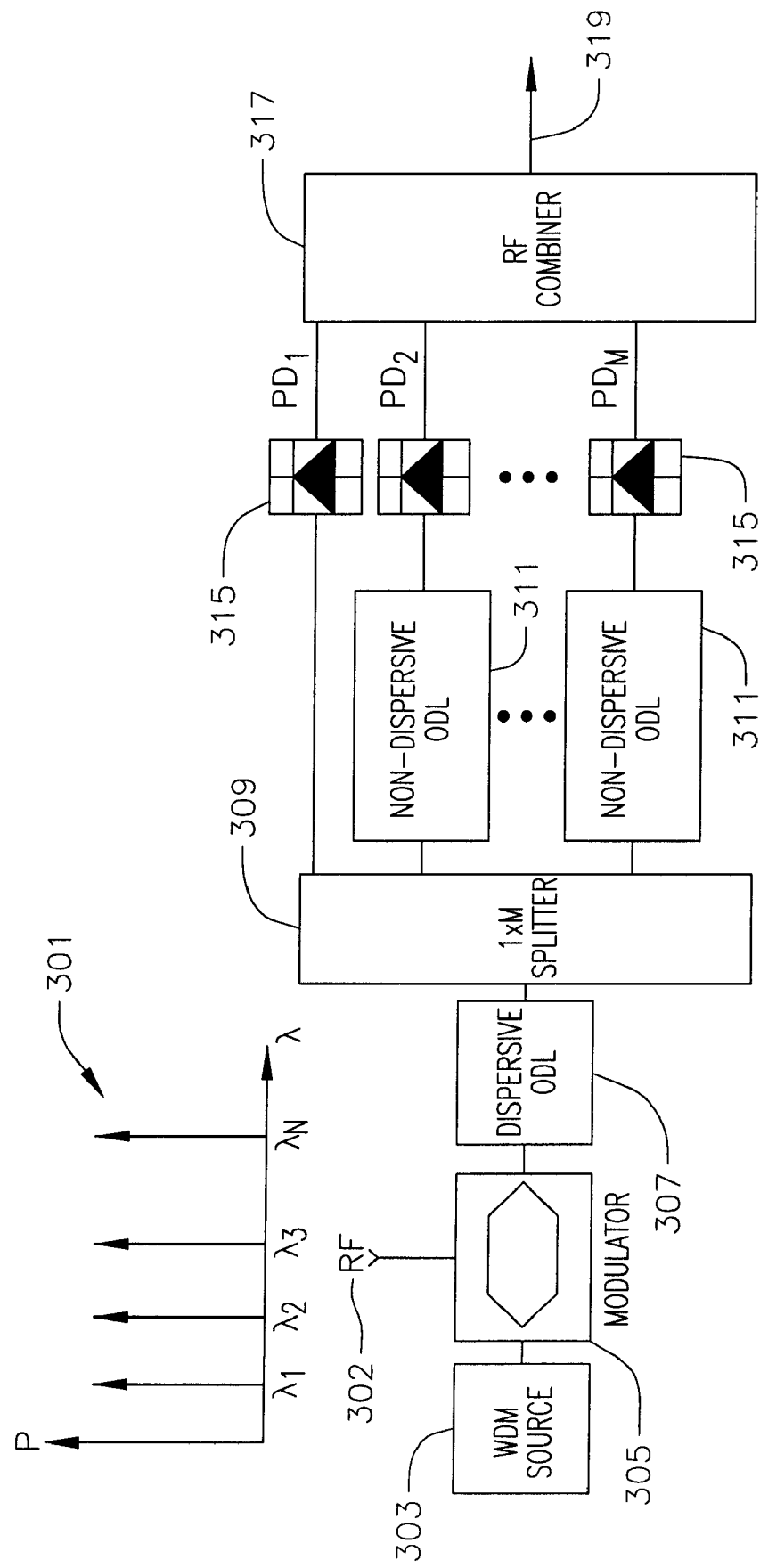
FIG. 3A shows a schematic of a filter architecture used in Vidal et al. to generate multiple taps from one input wavelength.
Figure 5A:
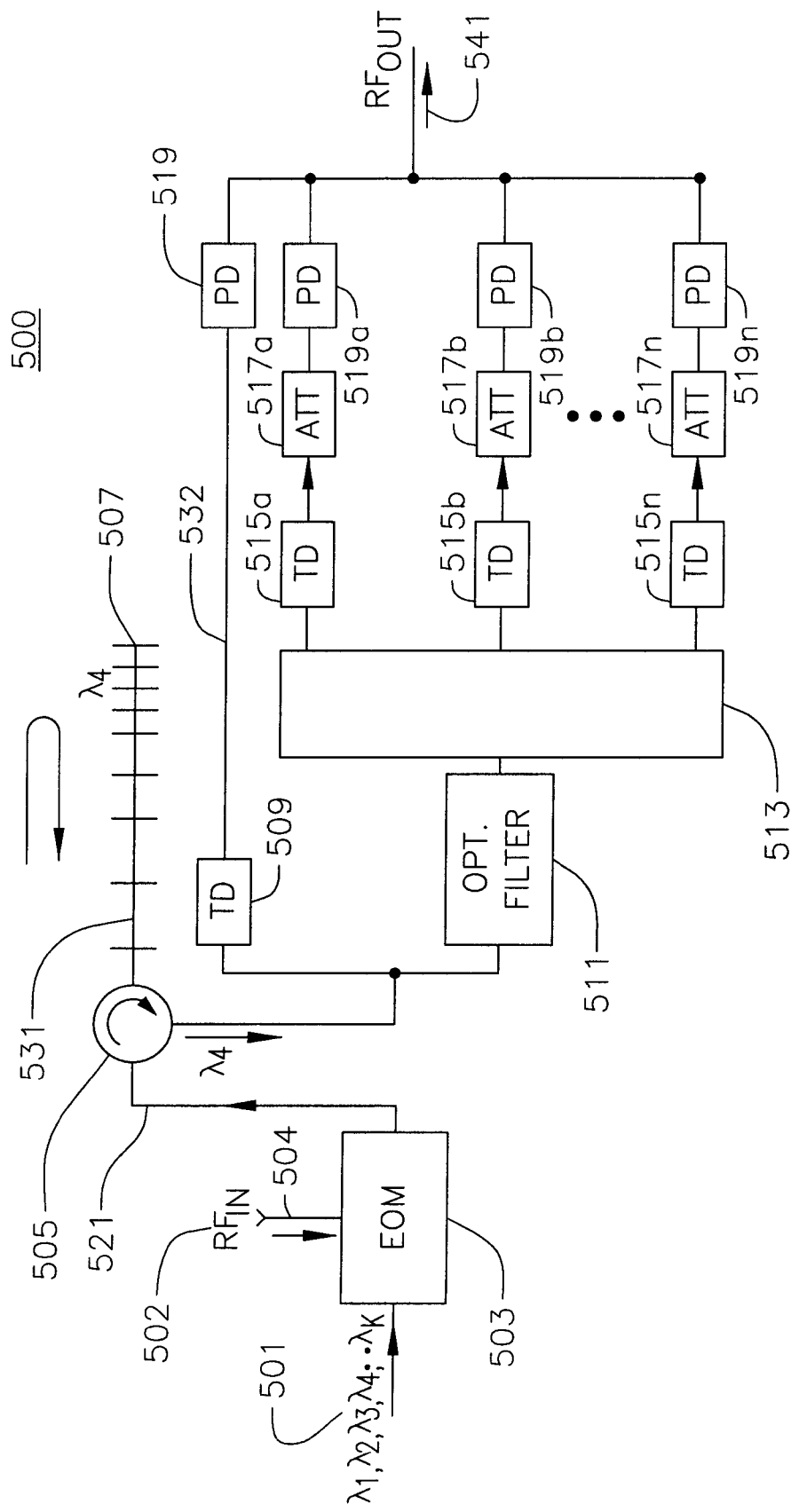
FIG. 5A shows a schematic block diagram of an approach for generating apodized tap-weights together with wavelength reuse according to the embodiments of the invention.

As explained above, the signal processing unit 40 may include FIR filters that may be implemented in various forms. FIG. 2A shows one implementation of the FIR filters that was described in U.S. patent application Ser. No. 10/701,109, entitled "A Bipolar RF-Photonic Transversal Filter with Dynamically Reconfigurable Passbands," the entire content of which is incorporated herein by reference, and which has been assigned to the Assignee of the present application. FIG. 3A shows another implementation of the FIR filters published in a journal article. FIG. 5A shows implementation of the FIR filters according to the embodiments of the present invention.

Referring first to FIG. 2A, filter 200 shows an exemplary implementation of the FIR filter with interlaced bipolar taps. Interlaced bipolar taps indicate that the taps of this filter have tap coefficients that are both positive and negative, therefore bipolar, and that the positive and negative taps occur alternately and are therefore interlaced. In the filter 200, a set of eight equally spaced continuous-wave optical carriers 201, including carriers of wavelengths $\lambda_1, \lambda_2 \ldots \lambda_8$, are input to a modulator 205. While only eight carriers 201 are shown, any N number of carriers may be used. The carriers 201, having wavelengths $\lambda_1, \lambda_2 \ldots \lambda_8$, may be generated by a set of eight single frequency lasers and input to a multiplexer (not shown). The lasers may be distributed feedback lasers or tunable external cavity lasers or the like. The multiplexer may be an array-waveguide grating (AWG) multiplexer. The output wavelengths of the lasers may be aligned along an ITU-grid with a standard channel spacing of 100 GHz near a wavelength of 1550 nm. The difference between the frequencies of two successive carriers is called a channel spacing. In that case, the difference between the frequencies of two waves that have consecutive frequencies and whose wavelengths are in the vicinity of 1550 nm would be 100 GHz. In other words $(f_{opt})_{i+1} - (f_{opt})_i = \Delta f_{i, i+1} = 100$ GHz.

An EOM is used as the modulator 205. An RF signal 203 to be filtered is input also to the modulator 205. The modulator 205 modulates the amplitudes of the optical carriers 201 using the RF input signal 203. Amplitude modulated signals are input via a circulator 207 to a dispersive medium such as a chirped fiber grating (CFG) 209. The incident waves of the carriers 201 are reflected from the gratings of the CFG 209 back toward to the circulator 207. The dispersion in the CFG 209 introduces a relative time delay between reflected waves corresponding to the wavelengths $\lambda_1, \lambda_2 \ldots \lambda_8$ of the carriers 201. Carriers 201 that are each amplitude modulated by the RF signal 203 are reflected back from the CFG 209 separated in time by a time delay inserted between each two carriers 201 based on the wavelength of the carrier 201.

The reflected sets of waves form the filter taps that are directed through an optical isolator 211 to a first Fabry-Perot ($FP_1$) etalon 215 and a second Fabry-Perot ($FP_2$) etalon 216 that each operate as subfilters. The isolator 211 operates as a check valve and prevents the waves going through to be reflected back toward the circulator 207. Each etalon 215, 216 passes only certain wavelengths of the carriers 201 and rejects the rest. For example, the $FP_1$ etalon 215 passes only the odd numbered carriers λodd (e.g., $\lambda_1, \lambda_3, \lambda_5, \lambda_7$) and the FP1 etalon 216 passes only the even numbered carriers λeven (e.g., $\lambda_2, \lambda_4, \lambda_6, \lambda_8$). By the time the carriers 201 reach the two etalons 215, 216, the carriers 201 are amplitude modulated by the RF input 203 and spread in time with respect to one another by the delay introduced by the CFG 209.

RF signals modulating the odd and even carriers are transferred by the FP1 etalon 215 and the FP2 etalon 216 to a double balanced receiver 220 that combines the two entries. The double balanced receiver 220 includes two photodiodes 221 and 223 that receive the outputs of the FP1 etalon 215 and the FP2 etalon 216, respectively. Outputs of the photodiodes 221, 223 are combined in an amplifier 225. A filtered RF signal 213 is output from the double-balanced receiver 220. By transmitting the odd numbered carriers 201 with wavelengths $\lambda_1, \lambda_3, \lambda_5, \lambda_7$ to the positive photodiode 221 and the even numbered carriers 201 with wavelengths $\lambda_2, \lambda_4, \lambda_6, \lambda_8$ to the negative photodiode 223, a polarity interlaced series of taps are generated by the double-balanced receiver 220. In the architecture of the filter 200, the incident paths to the upper and lower photodiodes 221, 223 are intrinsically balanced in amplitude and phase. Therefore, there is no need to adjust the paths to obtain phase and amplitude balance.

Figure 2B:
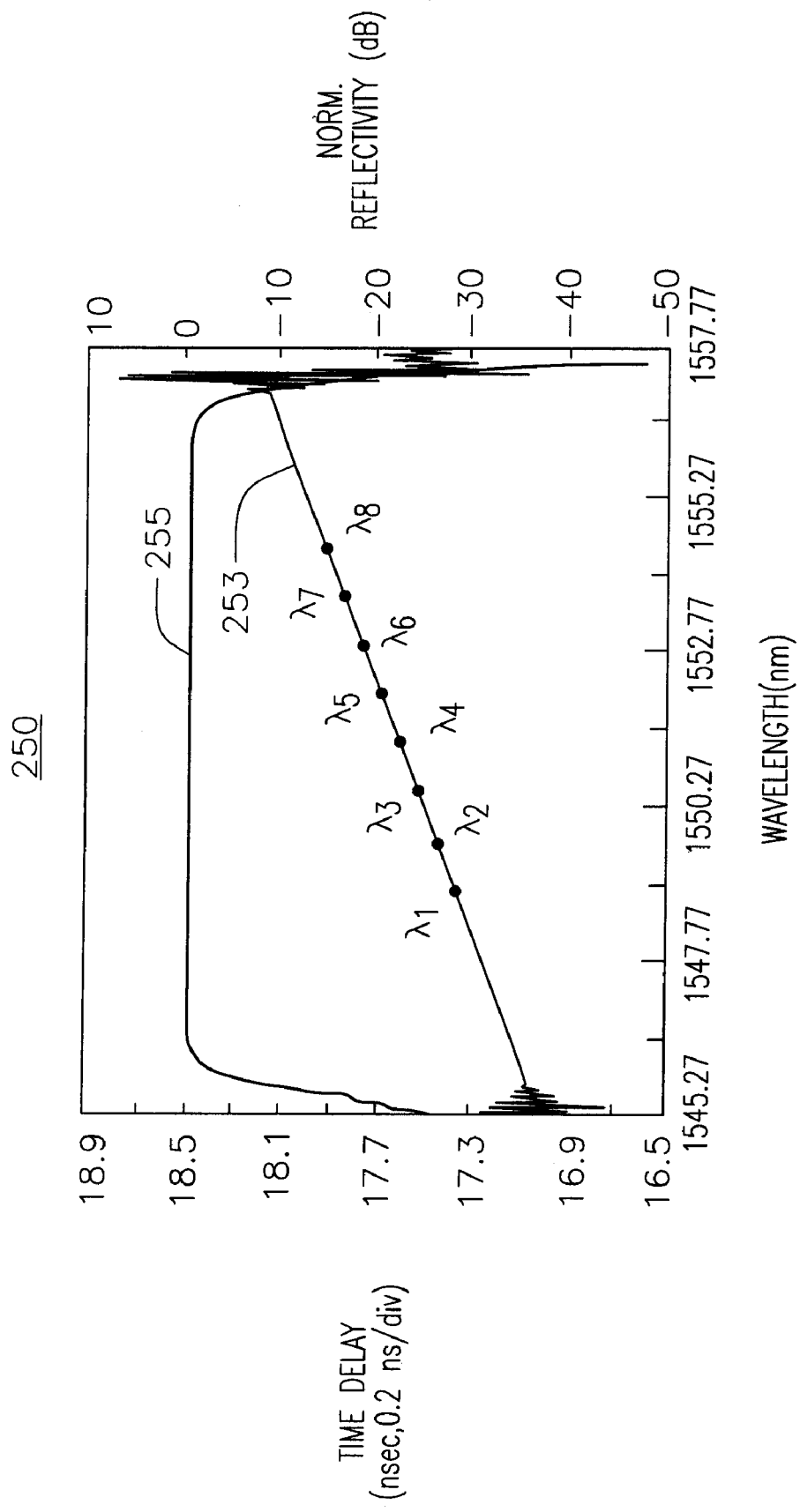
FIG. 2B shows a series of time delayed filter taps obtained via reflection from a chirped fiber grating (CFG) that is a component of the filter of FIG. 2A.

FIG. 2B is a plot 250 showing the linear dispersion of the delayed optical carriers 201 having wavelengths $\lambda_1, \lambda_2 \ldots \lambda_8$ by the CFG 209 of FIG. 2A. The wavelengths $\lambda_1, \lambda_2 \ldots \lambda_8$ of delayed optical carriers 201 are shown along the horizontal axis in nm units and the time delays 253 introduced by the CFG 209 are shown on the vertical axis in ns units. Time delay introduced between each two carriers 201 of consecutive wavelength is τd. For example, if the CFG 209 introduces a time delay of 97.6 ps per 1 nm of wavelength and if two wavelengths are 1.25 nm apart in magnitude, then after being reflected back from the CFG, these two wavelengths will arrive 122 ps apart. The shorter wavelength arrives first and the longer wavelength will be delayed by 122 ps or 0.122 ns behind the shorter one. The CFG 209 possesses linear dispersion characteristics and the grating period of the CFG 209 varies along its length so that each of the eight (or M) wavelengths are reflected back toward the circulator 207 at different positions along the CFG 209. As a result, the incident carriers 201 that arrive together at the CFG 209 each incur a different time delay that varies linearly with the wavelength λ of the incident carrier 201. The vertical axis on the right side of the plot in FIG. 2B shows a normalized reflectivity coefficient of the various carriers 201 reflected by the CFG 209. The reflectivity provides a measure of the energy or amplitude of the reflected wave as a fraction of the incident wave. As the reflectivity curve 255 indicates, the reflectivity remains relatively constant over the range of various wavelengths. The normalized reflectivity 255 in FIG. 2B is about 96% for the eight different carriers 201 reflected by the CFG 209. FIG. 2B indicates that while the time delay τd between the reflected waves is a linear function of the incident wave's wavelength, the amplitude of the reflected wave does not vary with wavelength. The CFG 209, therefore, does not impact the amplitude of the carriers 201. The amplitude of the carriers 201 may be controlled and set at the lasers that produce the carriers. Thereafter, these amplitudes remain relatively constant or they all deteriorate substantially equally while passing through the filter 200 as shown by the reflectivity curve 255.

Figure 2C:
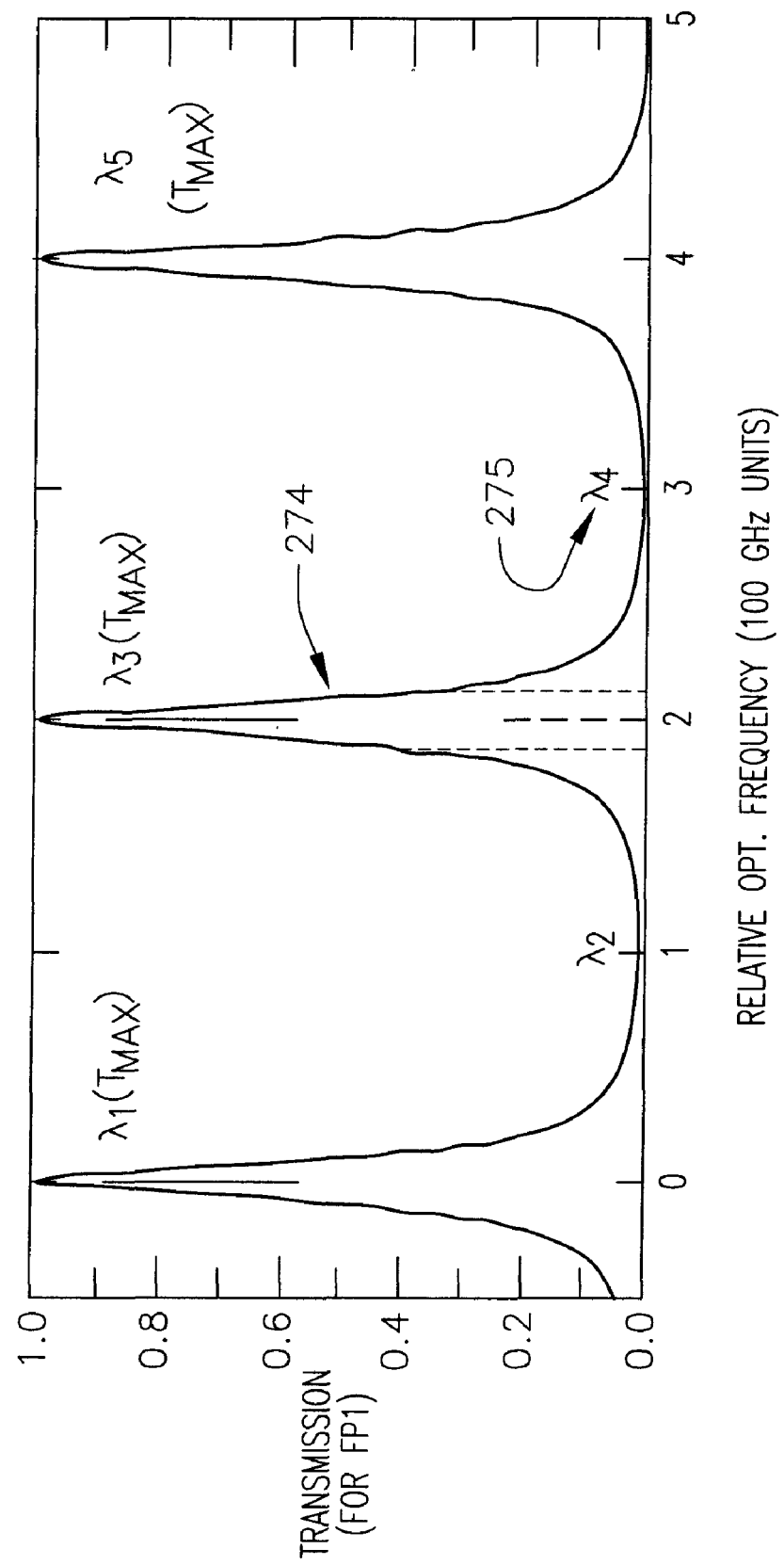
FIG. 2C shows transmission passbands of Fabry-Perot Etalons of FIG. 2A.

FIG. 2C shows passband and stopband characteristics of the FP1 etalon 215 of FIG. 2A. The horizontal axis includes the relative optical frequency of the waves entering the FP1 etalon 215 and the vertical axis shows normalized transmission for each relative wave frequency as a fraction of 1. Maximum transmission for the FP1 etalon 215 occurs at the odd wavelengths $\lambda_1, \lambda_3$, and $\lambda_5$ that this etalon passes through. The FP2 etalon 216 of FIG. 2A would have similar passband characteristics except that maximum transmission for this subfilter would occur at even wavelengths $\lambda_2, \lambda_4$, and $\lambda_6$. With the channel spacing of 100 GHz between each two carriers with consecutive frequencies, each etalon 215, 216 has a free spectral range (FSR) of 200 GHz that is twice the frequency spacing between carriers 201 having successive frequencies. Each etalon's passband 274 corresponds to the other etalon's stopband 275. Further, the passbands of the FP1 etalon 215 are offset from the passbands of the FP2 etalon 216 by the channel spacing or 100 GHz.

In summary, single frequency lasers with evenly spaced emission wavelengths $\lambda i$, with corresponding optical frequencies (fopt)i, yield filter taps that are equally spaced in wavelength or frequency. In the example shown in FIGS. 2A, 2B, and 2C, the channel spacing is $(\lambda_{i+1}-\lambda_i) \sim 0.8$ nm or $(fopt)_i-(fopt)_{i+1}=100$ GHz for tap wavelengths in the vicinity of 1550 nm. Next, time delays $\tau d$ that are less than 100 psec are inserted between the filter taps arriving together but having wavelengths $\lambda_i$ and $\lambda_{i+1}$. So, the filter architecture of FIG. 2A generates filter taps that are equally spaced in frequency and are spaced apart in time at equally spaced time delays. The amplitudes of the filter taps are uniform when generated and are not substantially affected by the grating that introduces the time delay between the incident waves (see FIG. 2B). So, if the lasers generating the unmodified carriers generate waves of equal energy (amplitude), then the filter taps are produced as a set of equidistant waves of equal amplitudes.

However, using the filter architecture shown FIG. 2A, one can generate only one filter tap per wavelength. This limits the width $\Delta f$ of the passband to approximately $1/(N\tau d)$. N is the number of filter taps (e.g., N=8 in FIG. 2A), that is equal to the number of input wavelengths $\lambda i$ in this scheme, and $\tau d$ is the time delay between two successive $\lambda i$ after they are passed through a delay introduction mechanism such as the CFG 209 of FIG. 2A. If a narrower passband, that provides a higher resolution filter, is required, then the number of carriers (wavelengths) have to be increased. Because, single waveform lasers are usually used to generate each carrier, then the number of components required for the filter increases which in turn increases the overall cost of the filter. In order to obtain a larger number of filter taps from the same number of input wavelengths, schemes for wavelength reuse have been proposed in the literature.

One exemplary wavelength reuse scheme is described in the "Efficient Architecture for WDM Photonic Microwave Filters," B. Vidal, V. Polo, J. L. Corral, and 1. Maui, IEEE Photonics Technology Letters, Vol. 16, No. 1, 2004, pp. 257-259. FIG. 3A shows a schematic of the approach used in Vidal et al. to generate multiple taps from one input wavelength. A set of N equally spaced continuous wave optical carriers 301 is generated by N single wavelength lasers and input to the WDM source 303. The N carriers 301 having wavelengths $\lambda_1 \ldots \lambda_N$ are each amplitude modulated by an input RF signal 302 in a modulator 305. Modulated carriers 301 are input to a dispersive optical delay-line (ODL) 307, such as a CFG that inserts a relative time delay Td between the modulated carriers 301. The N amplitude-modulated time delayed optical carriers being output by the ODL 307 are then equally power split into M branches by the 1×M optical splitter 309. Then, there is an amplitude-modulated optical carrier 301 at each of the M outputs of the splitter 309 and there is a time delay of Td between each two outputs of the splitter 309. The output of the first branch of the splitter 309 is directly directed to a first photodetector PD$_1$ 315. Outputs of the remaining branches of the splitter each pass through a separate non-dispersive optical delay line 311 before being directed a separate photodetector PD$_2 \ldots$ PD$_M$ 315. The photodetectors may be photodiodes that convert optical signals into electrical signals. Therefore, within each branch, the N carriers are further delayed by the nondispersive optical delay line 311. Each of the carriers are also called taps. After the optical power of the taps from the M branches of the splitter 309 is detected by the array of photodetectors PD$_1 \ldots$ PD$_M$ 315, the RF outputs of the photodetectors 315 are combined in an RF combiner 317 to generate the filtered RF output 319. The RF combiner 317 may be a M×1 microwave power combiner. This scheme uses N lasers (not shown) to produce N wavelengths and M nondispersive optical line delays 311 to obtain N×M filter taps.

Figure 3B:
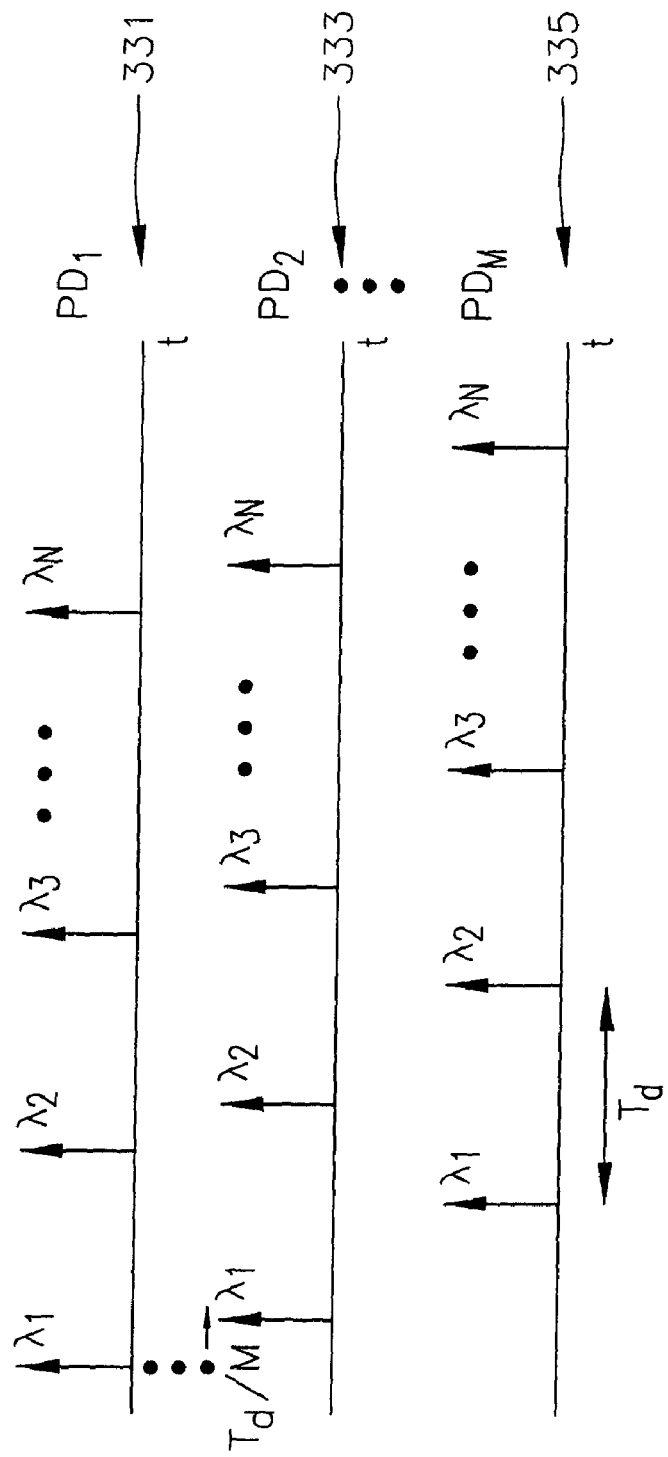
FIG. 3B shows generation of M taps from each input wavelength in the filter of FIG. 3A.

FIG. 3B shows the output of the M−1 nondispersive optical delay lines 311 of FIG. 3A. Each nondispersive optical delay line 311 delays all of the N taps incident on it by p(Td/M), where p=0 . . . (M−1) corresponding to the nondispersive optical delay line 311. As a result, M sets of taps 331, 332, 333 are generated that each include N taps $\lambda_1 \ldots \lambda_N$ all having the same amplitude or tap coefficients ai. The time delay between two successive taps of the same wavelength $\lambda i$ would be a finer time delay equal to Td/M. Thus, the impulse response of this filter would be due to M×N taps having wavelengths $\lambda_{11}$, $\lambda_{12} \ldots \lambda_{1N}, \lambda_{21}, \lambda_{22} \ldots \lambda_{M1}, \lambda_{M2} \ldots \lambda_{MN}$, where every two successive taps $\lambda_{11}$ and $\lambda_{21}$ or $\lambda_{ij}$ and $\lambda_{i+1,j}$ are set apart by the time delay of Td/M.

FIG. 3C shows filter response 350 obtained for uniform amplitude tap coefficients ai, with 6 taps derived from 3 input wavelengths using the filter scheme of Vidal, et al. where N=3 and M=2. The horizontal axis shows the frequency in GHz and the vertical axis shows the amplitude response in dB. The vertical axis in effect shows the attenuation of an input amplitude by the filter and is therefore shown in negative units of dB. To generate the frequency response of FIG. 3C, three lasers (N=3) with a wavelength spacing of $\Delta\lambda=3.2$ nm are used. Seven kilometers of standard single mode fiber is used for the dispersive ODL 305. Therefore, the linear time delay between optical carriers due to the fiber dispersion the dispersive ODL 307 is Td=3.2 nm*7 km*16.5 ps/9 nm·km. The absolute time delay Ta between two optical carriers $\lambda_{11}$ and $\lambda_{21}$ or $\lambda_{12}$ and $\lambda_{22}$ or $\lambda_{13}$ and $\lambda_{23}$ once they reach the photodetectors 315 is Td/2 because M=2 and Td/M=Td/2. This absolute time delay results in a time interleaving between the two sets of optical carriers $\lambda_{11}, \lambda_{12}, \lambda_{13}$ and $\lambda_{21}, \lambda_{22}, \lambda_{23}$ respectively entering PD$_1$ and PD$_2$ that are the two photodetectors 315 for M=2. Interleaving between the two sets of carriers results in a six tap photonic microwave filter having taps of wavelengths $\lambda_{11}, \lambda_{21}, \lambda_{12}, \lambda_{22}, \lambda_{13}, \lambda_{23}$. The number of nulls 355 between every two main lobes 357 of the filter response 350 is five which is equal to the number of taps (six) minus one or M×N−1.

The restriction inherent in the scheme of multiple tap generation presented in FIGS. 3A, 3B, and 3C is that it cannot be applied to the formation of filters that have amplitude tapered tap weights. Without amplitude-tapering, i.e., apodization of the filter-coefficients, the best SLSR that one can achieve is approximately 13.5 dB, which occurs when all M×N tap weights, or wavelength amplitudes, are equal. This maximum SLSR is demonstrated in Vidal et al. and shown in FIG. 3C.

As shown in FIG. 1 and as described, there is a substantial need in using photonic links for signal distribution in antenna systems. It has also been established that RF-photonic links in so called fiber-radio networks have tremendous commercial potential for distributing microwave signals, especially those at mm-wave frequencies, between the base-station of a wireless network and the remoted sites of transmit/receive antennas. However, a narrow bandwidth together with a high SLSR is required to improve optical fibers used in photonic links. As shown in FIGS. 2A and 2C, interlaced bipolar taps may be obtained that control the intermediate frequency of passbands of the filter response. The width of the passbands thus obtained are, however, a function of the number of filter taps and using few filter taps results in wide passbands that do not provide sufficient accuracy for some applications. FIGS. 3A and 3C show how passbands can be narrowed by wavelength reuse that increases the number of taps without requiring extra lasers for generating more wavelengths. The wavelength reuse scheme of FIGS. 3A and 3C, however, yields a SLSR of 13.5 dB which is too small to be of practical interest in the above photonic link applications.

By controlling the optical energy or power in the wavelengths $\lambda i$ one can vary amplitudes of the filter taps. The amplitudes of the wavelengths $\lambda i$ are the filter tap weights or filter tap coefficients ai. Varying the power in each wavelength that results in tapering or modifying the amplitudes ai of the various filter taps is referred to as apodization. Apodization of tap coefficients improves SLSR. However, apodization cannot be applied to the scheme of FIG. 3A.

Figure 4:
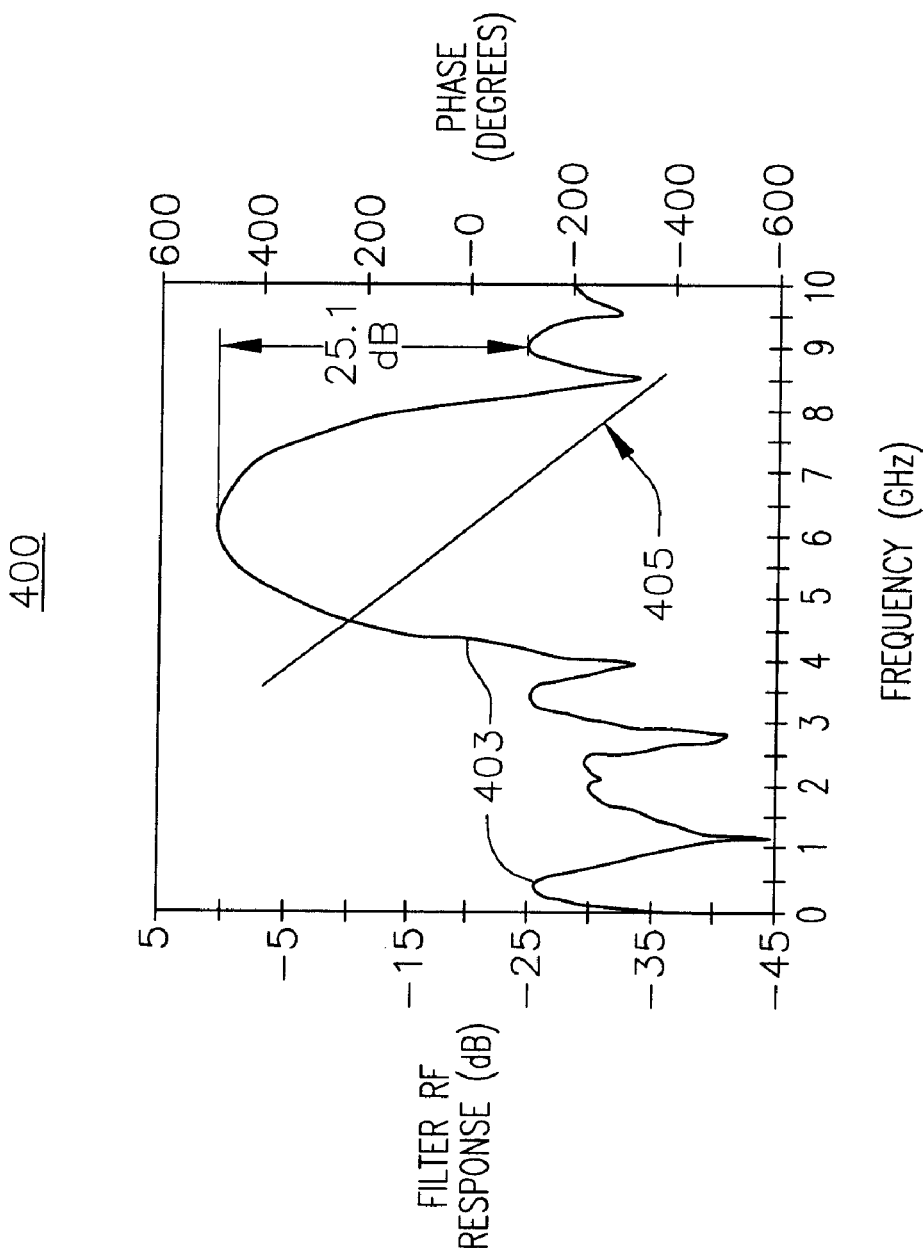
FIG. 4 shows measured and simulated RF-response of a WDM based transversal filter according to the embodiments of the invention for tap weights apodized according to the Dolph-Chebyshev algorithm (with $\alpha=2$).

FIG. 4 shows the measured and simulated RF response 400 of WDM based transversal filters obtained for tap coefficients ai apodized according to the Dolph-Chebyshev algorithm (with $\alpha=2$). Apodized tap coefficients ai help achieve a high SLSR in the filter response. Frequency is shown on the horizontal axis and amplitude 403 in dB and phase 405 in degrees of the filter response 400 are shown on the vertical axes on two sides of the plot. This filter response 400 corresponds to the filter response 350 of FIG. 3C that was obtained through $\lambda$ reuse but without apodization. A comparison between the two responses 350, 400 shows that in the response 400 by using apodization a SLSR of 25.1 dB is obtained while using the same number of taps in the response 350 without apodization of tap coefficients yields a SLSR of only 13.5 dB. Other examples of SLSR improvement by using various forms of apodization may be found in the U.S. patent application Ser. No. 10/701,109 that shows side lobe suppression obtained when the tap coefficients are apodized according to Gaussian window, a sin c window, and a Hamming window.

Embodiments of the present invention combine the aspects of wavelength reuse and apodization to obtain an even higher SLSR without having to significantly increase the components of the filter. The observation that the maintenance of good SLSR is achieved via the employment of apodized tap weights derived from a $\lambda$ reuse scheme is a novel concept requiring the computation of filter responses (derived from approximate tap coefficients) to verify.

FIG. 5A shows a block diagram of an exemplary embodiment of the present invention for accomplishing both wavelength reuse and tap weight apodization. As explained above, wavelength reuse allows generation of multiple taps per each input wavelength which in turn yield finer and narrower passbands and apodization increases the SLSR of the filter.

FIG. 5A implements a filter 500 that first forms attenuated versions of a subset of original wavelength taps, and then uses them to generate additional taps that approximate a given set of apodized tap coefficients. Each of the original taps is derived from a single frequency laser (not shown). The input wavelengths [$\lambda i$ (i=1 ... K)] are then time-delayed by reflection from a length of a chirped fiber grating (CFG).

Original taps 501 having wavelengths $\lambda_1 \ldots \lambda_k$ are generated by separate single frequency diode lasers with uniform amplitudes. The amplitude of a wave determines the wave power and energy. Alternatively, the optical power in each $\lambda_i$ is pre-set at the time of generation at the laser to support a targeted apodization scheme. The set of K wavelength taps 501 is input to a modulator 503. An RF input 502 that is filtered by the filter 500 is received at an antenna 504 and also input to the modulator 503. The RF input 502 is used to modulate the amplitudes of the taps 501.

Amplitude modulated taps 521 are input through a circulator 505 to a CFG 507. The CFG 507 may implement Bragg reflection to introduce time delay. The CFG 507 introduces a time delay $\tau d$ between every two taps 521 successive in wavelength or frequency and separates them in time such that $\lambda_1$ arrives before $\lambda_2$ and $\lambda_{k-1}$ arrives before $\lambda_k$ by the amount of time delay $\tau d$. Because the differences between wavelengths of two successive taps are uniform and because the CFG 507 operates linearly as a function of wavelength, the same time delay is introduced between two taps whose wavelength are successive as shown in the plot 250 of time delay versus wavelength. The CFG 507, however preserves the amplitudes of each arriving tap 521 and reflects them back without any substantial impact on the amplitude. As set forth previously, amplitude of a tap having wavelength $\lambda_i$ is the tap coefficient denoted ai.

Time delayed taps 531 are reflected back to the circulator 505 from the CFG 507 and are sent to two different branches. One branch includes a time delay (TD) 509 that may be formed from a certain length of fiber. The taps 531 that pass through the time delay 509 are all delayed by the same amount to generate taps 532 which include all of the original taps 501 having wavelengths $\lambda_1 \ldots \lambda_k$.

The taps 532 are then passed through a photodetector (PD) 519 that generates an electrical signal 541 corresponding to the arriving optical signal delivered by the amplitude modulated and delayed taps 532. When a positive PD 519 is used in a branch, the polarity of the generated electrical signal remains the same as the polarity of the arriving photonic signal. If a negative PD 519 is used, the polarity of the optical signal may be changed while the signal is being converted to an electrical signal.

The time delayed taps 531 are also passed through an optical filter 511 which filters some of the wavelengths and allows other wavelengths to pass through. A 1:Q splitter 513 splits the passing taps into Q branches. Each branch may further include its own time delay, attenuator 5, and photodetector, i.e., time delays 515a-515n, attenuators 517a-517n, photodetectors 519a-519n. The photodetector in each of the Q branches may preserve the polarity of the incoming photonic signal or change it. The characteristics, organization, and numbers of the time delays, attenuators, and photodetectors determines the filter function to be implemented by the filter 500. A filtered output RF signal 541 is obtained when outputs of the photodetectors are combined.

Figure 5B:
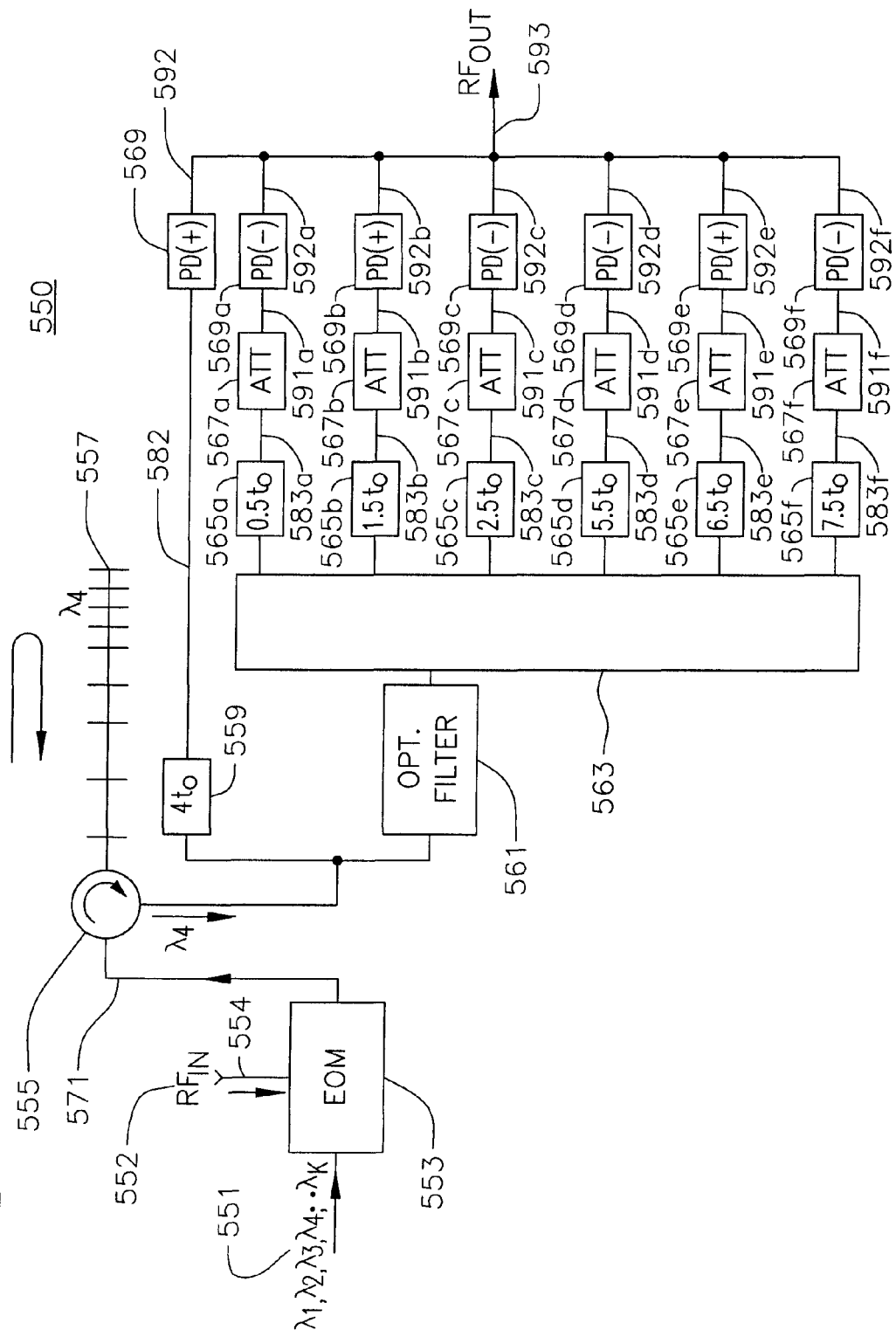
FIG. 5B shows a schematic block diagram of the approach of FIG. 5A used for generating tap weights that are apodized according to a sin c function together with wavelength reuse according to the embodiments of the invention.

FIG. 5B shows a filter 550 that whose components are organized to implement a filter having a sin c shaped transfer function. Original taps 551 having wavelengths $\lambda_1 \ldots \lambda_k$ are generated by separate single frequency diode lasers with uniform amplitudes. The set of K wavelength taps 551 is input to a modulator 553. An RF input 552 that is filtered by the filter 550 is received at an antenna 554 and also input to the modulator 553. The RF input 552 is used to modulate the amplitudes of the taps 551.

Amplitude modulated taps 571 are input through a circulator 555 to a CFG 557. The CFG 557 introduces a time delay $\tau d$ between every two amplitude modulated taps 571 successive in wavelength or frequency and separates them in time by the amount of time delay $\tau d$. The CFG 557 preserves the amplitudes of each arriving tap 571 and reflects them back without any substantial impact on the amplitude.

Time delayed taps 581 are reflected back to the circulator 555 from the CFG 557 and are sent to two different branches. One branch includes a time delay 559. In the exemplary filter 550 shown in FIG. 5B, the delay 559 is exemplarily set equal to 4 $t_0$. The taps 581 that pass through the time delay 559 are all delayed by the same amount to generate taps 582 which include all of the original taps 551 with wavelengths $\lambda_1 \ldots \lambda_k$. In the exemplary filter 550, if K=5 and five original taps 551 having wavelengths $\lambda_1 \ldots \lambda_5$ are input to the filter, with the middle wavelength $\lambda_3$ occurring at t=0, then all of these five taps are delayed by 4 $t_0$ such that the middle wavelength $\lambda_3$ now occurs at 4 $t_0$ and the remaining wavelengths are centered about 4 $t_0$ (FIG. 6A) with a distance τd, that was introduced by the CFG 557, between each two taps of successive wavelength.

The taps 582 are then passed through a photodetector (PD) 569 that generates an electrical signal 592 corresponding to the arriving optical signal delivered by the amplitude modulated and delayed taps 582. When a positive PD 569 is used in a branch, the polarity of the generated electrical signal remains the same as the polarity of the arriving optical signal. For taps 582 the polarity is not changed.

The time delayed taps 581 are also passed through an optical filter 561 which filters some of the wavelengths and allows other wavelengths to pass through. In the exemplary filter 550, if K=5 and the set of original five taps 551 include $\lambda_1 \ldots \lambda_5$, then a subset including the center three wavelengths $\lambda_2, \lambda_3$, and $\lambda_4$ are allowed to pass through the filter 561 and the remaining wavelengths are filtered out. A 1:Q splitter 563 splits the passing taps, having wavelengths $\lambda_2, \lambda_3$, and $\lambda_4$ in the exemplary filter 550 shown, into Q branches.

All of the three taps with wavelengths $\lambda_2, \lambda_3$, and $\lambda_4$ that are passed through the optical filter 561 are also passed through each of time delays 565a-565f. The time delays 565a-565f in the exemplary filter 550 include a time delay 565a of 0.5 $t_0$, a time delay 565b of 1.5 $t_0$, a time delay 565c of 2.5 $t_0$, a time delay 565d of 5.5 $t_0$, a time delay 565e of 6.5 $t_0$, and a time delay 565f of 7.5 $t_0$. Time delays 3.5 $t_0$ and 4.5 $t_0$ are not used because they correspond to the time span occupied by the taps that are delayed by the time delay 559 that introduces the 4 $t_0$ central time delay. In this example, the time delay 559 sets the central group of unapodized taps and the time delays 565a-565f cause the group of passing subset of taps to be offset in time from one another and from the central set of taps. In other embodiments, a different number of time delays each introducing different amounts of delay may be used that yield a different filter transfer function.

Time delayed groups of passing middle taps 583a-583f are then fed to attenuators 567a-567f. The attenuators 567a-567f are used to control the amplitude of the taps in each of the branches including the time delays 565a-565f. The attenuators 567a-567f, therefore, apodize the tap coefficients a2, a3, and a4 corresponding to the taps with wavelengths $\lambda_2, \lambda_3$, and $\lambda_4$ in the exemplary filter 550. The other wavelengths were filtered out at the optical filter 561 and never reach the attenuators. The number of attenuators 567a-567f is equal to the number of time delays 565a-565f. Standard optical attenuators such as waveguides, electro-optic variable attenuators, or the like may be used to implement the attenuators 567a-567f.

Each group of apodized delayed taps 591a-591f is input to a photodetector 569a-569f which converts the received photonic signal 591a-591f into the electrical signal 592a-592f. Various photodetectors 569a-569f may have various polarities that in turn may conserve or change the polarity or phase of the arriving photonic or optical signal 591a-569f. The electrical signals 592 and 592a-592f generated by the photodetectors 569 and 569a-569f in each branch are combined together to form the filtered RF output signal 593.

Figure 6A:
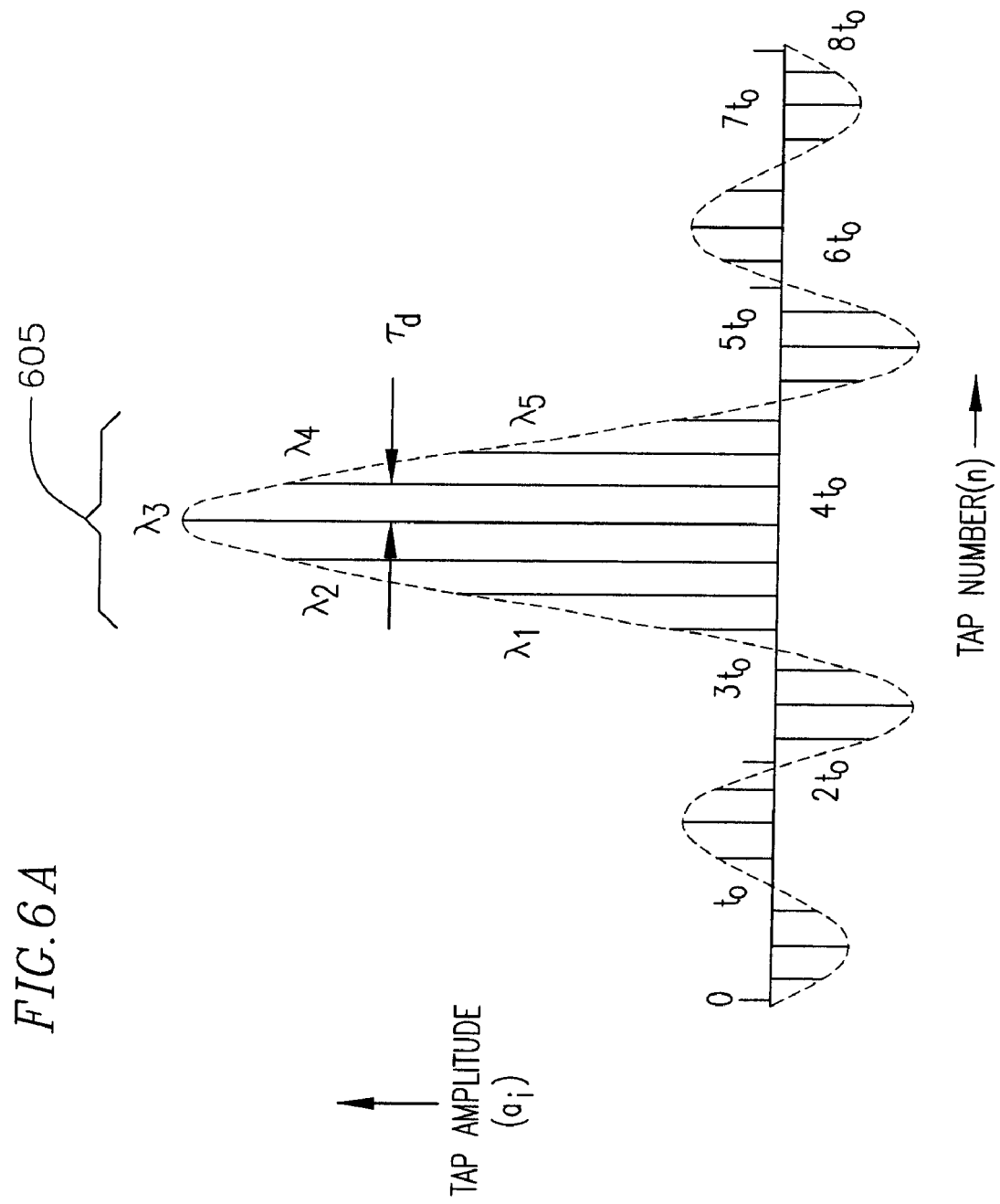
FIG. 6A shows the tap weights generated by the sin c apodization and wavelength reuse approach of FIG. 5B according to the embodiments of the invention.
Figure 6B:
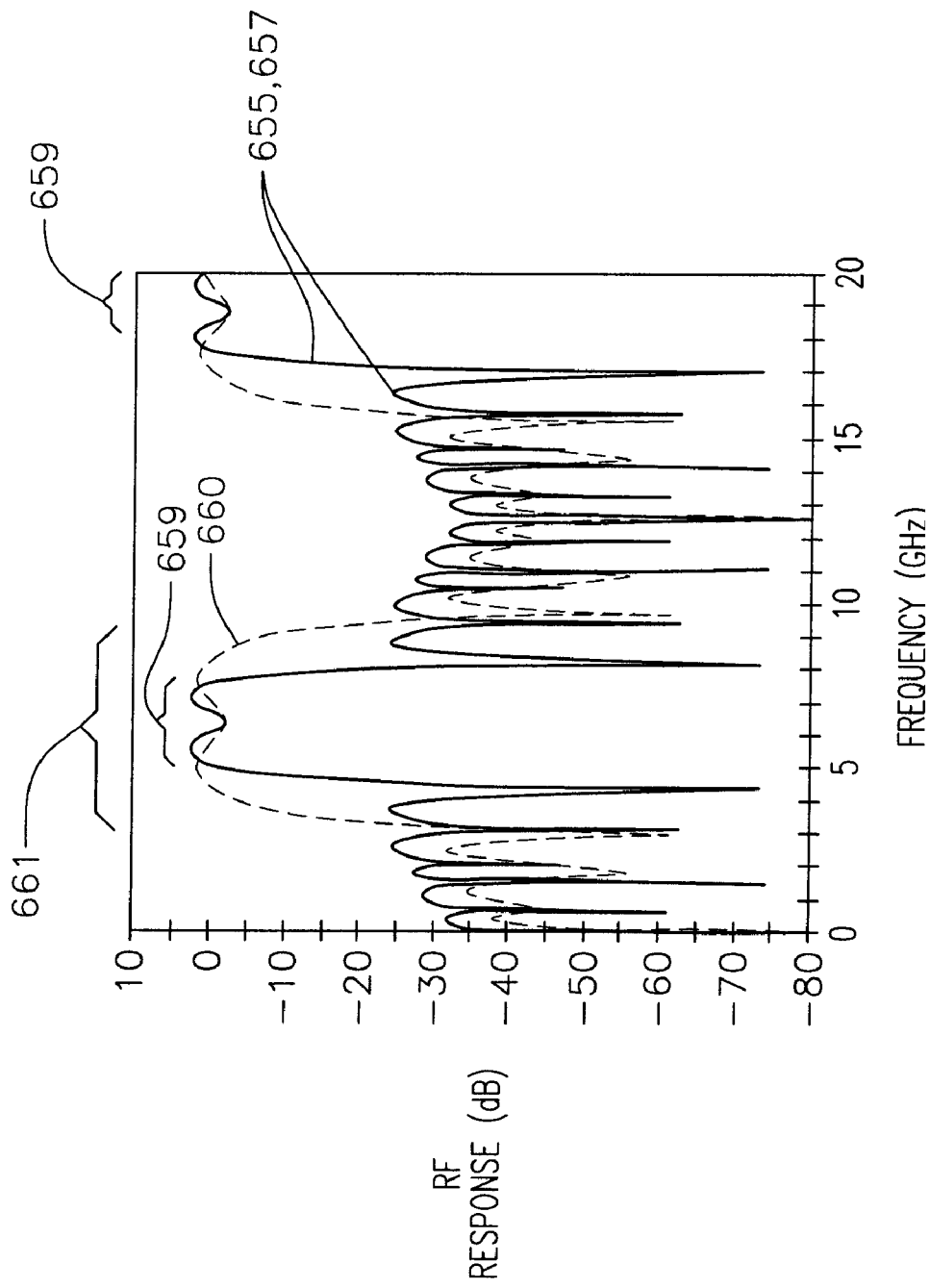
FIG. 6B shows a comparison of filter response of the filter of FIG. 5B and precise tap coefficients for a 20 tap sin c filter also superimposing a 10 tap sin c filter response for comparison.

FIGS. 6A and 6B show one example of the output of the filter 550 in time and frequency domains. FIG. 6A shows the results of wavelength reuse scheme for forming sin c apodization tap weights in the time domain. FIG. 6B shows the frequency domain filter response formed from the disclosed approach of filter 550 and tap coefficients for a 20-tap and a 10-tap filter with sin c-apodization that are superimposed in the same plot for comparison.

FIG. 6A illustrates the amplitude distribution defined by a "sin c-taper" according to one exemplary embodiment of the invention and corresponds to the architecture of filter 550 shown in FIG. 5B. Functions other than a sin c function may be used to apodize the taps. In that case the shape formed by the apodized tap amplitudes would correspond to the function used for apodization and would be different from the sin c function shape of FIG. 6A.

In FIG. 6A, the horizontal axis shows the tap number starting from 0 and extending to n. The vertical axis shows the tap amplitude or tap coefficient ai. In the exemplary embodiment shown, a group of waves with unapodized amplitudes 605 will form the center taps of an enlarged set of taps with apodized filter coefficients. Total number (P) of taps is enlarged by implementing the following scheme for the K wavelengths of the taps 551 input to the filter 550. Using the optical filter 561, first a subset of the K input wavelengths is selected, and then the subset is split into Q branches using the splitter 563. In the exemplary embodiment of FIG. 5B, a subset including the three middle wavelength $\lambda_2, \lambda_3, \lambda_4$ of a total of K=5 taps 551 with wavelengths $\lambda_1, \lambda_2, \lambda_3, \lambda_4, \lambda_5$ are selected and passed through the optical filter 561. Next, the time delays are set, for example, using a length of fiber or silica waveguide, within each branch marked 0.5 $t_0$, 1.5 $t_0$, 2.5 $t_0$, 5.5 $t_0$, 6.5 $t_0$, 7.5 $t_0$ in FIG. 5B. With the use of pre-designed time delays 565a-565f and attenuators 567a-567f within each branch, tap weights that become "edge-coefficients" can be formed in the enlarged "sin c-taper" scheme. The positive and negative polarities of the tap coefficients are implemented with the help of differential amplifiers or RF phase-shifters in photodetector 569, 569a-569f elements. FIG. 6A shows the sin c-taper coefficients that can be realized by filtering $\lambda_2, \lambda_3, \lambda_4$, and then creating Q=6 branches that are delayed by O.5 $t_0$, 1.5 $t_0$, 2.5 $t_0$, 5.5 $t_0$, 6.5 $t_0$, 7.5 $t_0$. Using the disclosed approach, P=K+(Ksubset*Q) apodized tap weights can be generated to form the filer 550. Ksubset denotes the number of wavelengths in the subset of K chosen by the optical filter 561 and in FIG. 5B, for example, K=5, Ksubset=3, and Q=6. Then P=5+(3*6)=23 total taps.

One important processing block introduced by the embodiments of the invention is the optical filter 511 in FIG. 5A or 561 in FIG. 5B that is placed in front of the 1:Q optical splitter 513, 563. Using this filter 511, 561 a subset of the input taps 501, 551 with wavelengths λi (i=1 . . . K) can be selected, and then reused for a targeted apodization scheme. Furthermore, the pre-designed time delays 515a-515n, 565a-565f and attenuations 517a-517n, 567a-567f implemented within each branch allow the wavelength-reuse scheme to vary the apodization with relative simplicity. In the exemplary embodiment shown in FIG. 5B, whose results appear in FIG. 6A, the sin c function is used for the apodization scheme. With varying the number of branches divided by the 1:Q splitter 513, 563 the delay caused by the time delays 515, 565 and the attenuation introduced by the attenuators 517, 567 other functions may be used to implement the wavelength reuse and apodization scheme.

FIG. 6B shows a comparison between the frequency response of a theoretical filter using the sin c function and a filter approximated by the scheme of filter 550 in FIG. 5B. Frequency is shown on the horizontal axis in units of GHz and the amplitude of the attenuation introduced by the filter is shown on the vertical axis in units of dB. Filter response obtained for a 20-tap filter formed from the use of an exact set of "sin c-taper" coefficients with K=20 wavelengths is shown with the curve 655. Filter response obtained for a 20-tap filter formed using the scheme of FIG. 5B with P=20 and K=10, that only approximates a "sin c-taper" apodization is shown with the curve 657. The two curves 655, 657 coincide for most of the plot and particularly in passband areas 659. A comparison of the theoretical 655 and approximate 657 curves shows that the scheme depicted in FIG. 5B maintains the same passband 659 width ($\Delta f$). Also, although not apparent at the scale of FIG. 6B, the theoretical curve 655 is only slightly below the approximate curve 657 in the side lobe areas. So, the approximate scheme of FIG. 5B only degrades the SLSR by 1 to 2 dB compared to the exact theoretical scheme.

FIG. 6B also plots the filter response 660 obtained with 10 wavelength taps that are apodized according to a precise sin c-taper. As shown, the passband 661 width ($\Delta f$) of the 10-tap filter is almost twice the passband 659 width of the 20-tap filter. Therefore, by switching from a precise 10-tap filter to a 20-tap filter formed via the approach of FIG. 5B, a signal of interest may be tracked with improved signal-to-noise ratio. Applying the same concepts, filter responses for apodized coefficients derived from other functions and statistical distributions may be used.

Figure 7A:
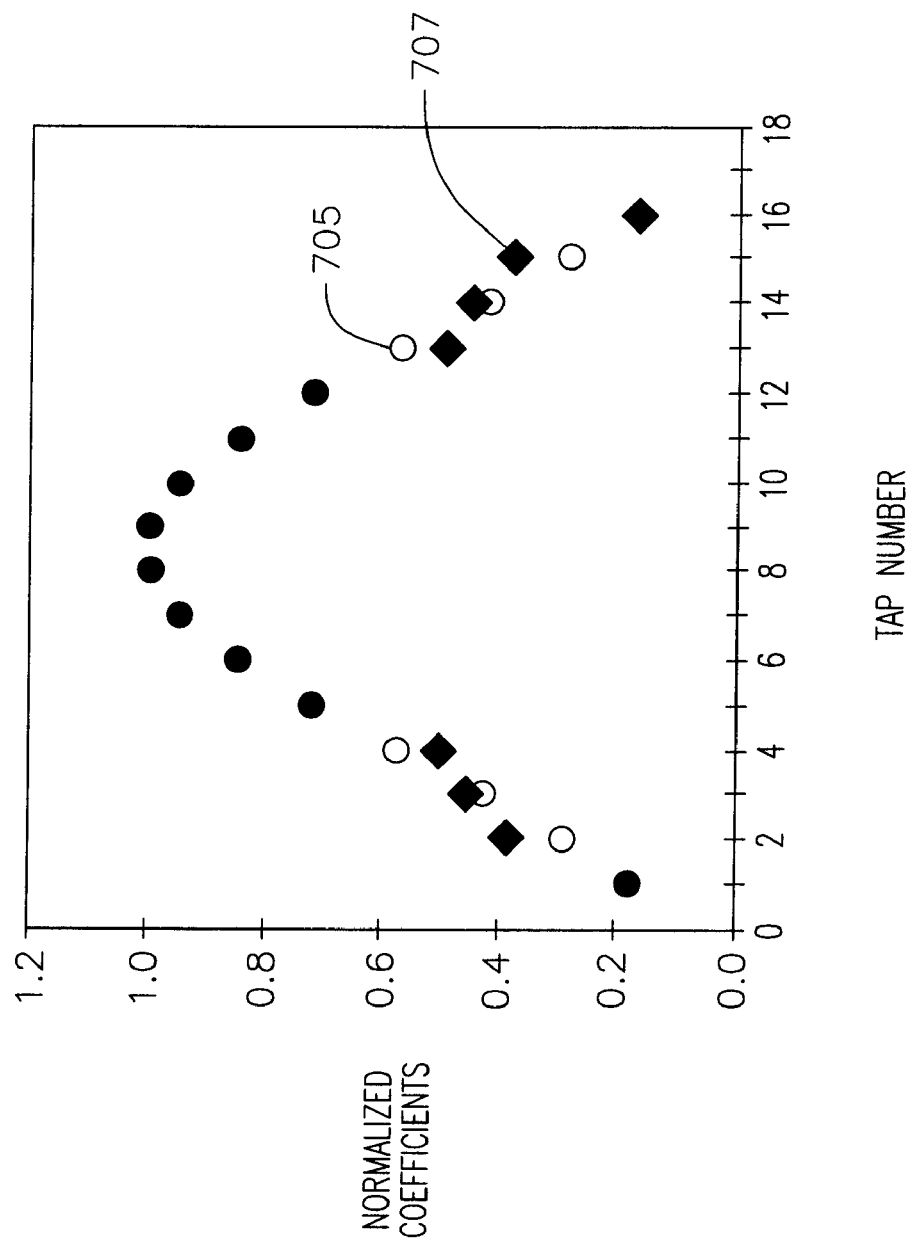
FIG. 7A shows tap coefficients for exact Dolph-Chebyshev filter ($\alpha=2$) and the approximate filter of the embodiments of the invention.

FIG. 7A shows tap coefficients for Dolph-Chebyshev filters ($\alpha=2$) that are derived according to one embodiment of the present invention. Tap number is shown on the horizontal axis and normalized coefficients are shown on the vertical axis. In the exemplary embodiment shown, 16 filter taps are used. The open circles 705 show the precise tap weights obtained for a 16-tap filter that uses $\alpha=2$ Dolph-Chebyshev coefficients. The solid diamonds 707 show a set of extrapolated coefficients that are formed via the implementation of a filter based on the embodiment shown FIG. 5A.

To use the Dolph-Chebyshev algorithms for apodizing reused filter taps according to a variation of the filter 500 of FIG. 5, the wavelengths near the center of the distribution that are in close agreement with the theoretical function are selected by the optical filter 511. Wavelengths between the center and the edge of the distribution, where the variation of the tap coefficients are approximately linear and deviate from the theoretical function, are filtered out by the optical filter 511 and discarded. In the example of FIG. 7A, of the 16 original taps, the eight central taps are kept and the four taps on one side and another four taps on the other side of the plot are discarded and reproduced by extrapolation in order to obtain a better match with the theoretical coefficients.

For example, in an extrapolated set of tap-coefficients, Tap 1, and then Taps 5 to 8 are identical to the set of exact coefficients and are therefore maintained by the filter 511. However, Tap 2, Tap 3, and Tap 4 in the set of approximate coefficients are derived, respectively, from Tap 5, Tap 6, and Tap 7, using pre-designed attenuations and time delays. Similarly, the approximate coefficients for Taps 13, 14, and 15 are derived from the precise coefficients of Taps 10, 11 and 12. Tap 16 is again right on point. Hence, all 16 filter taps are generated from 10 input wavelengths $\lambda_1, \lambda_5, \lambda_6, \lambda_7, \lambda_8, \lambda_9, \lambda_{10}, \lambda_{11}, \lambda_{12}, \lambda_{16}$ when K=16 and Ksubset=10. For generating the Dolph-Chebyshev filter coefficients, the photodetectors 519 do not need to alternate in polarity.

Figure 7B:
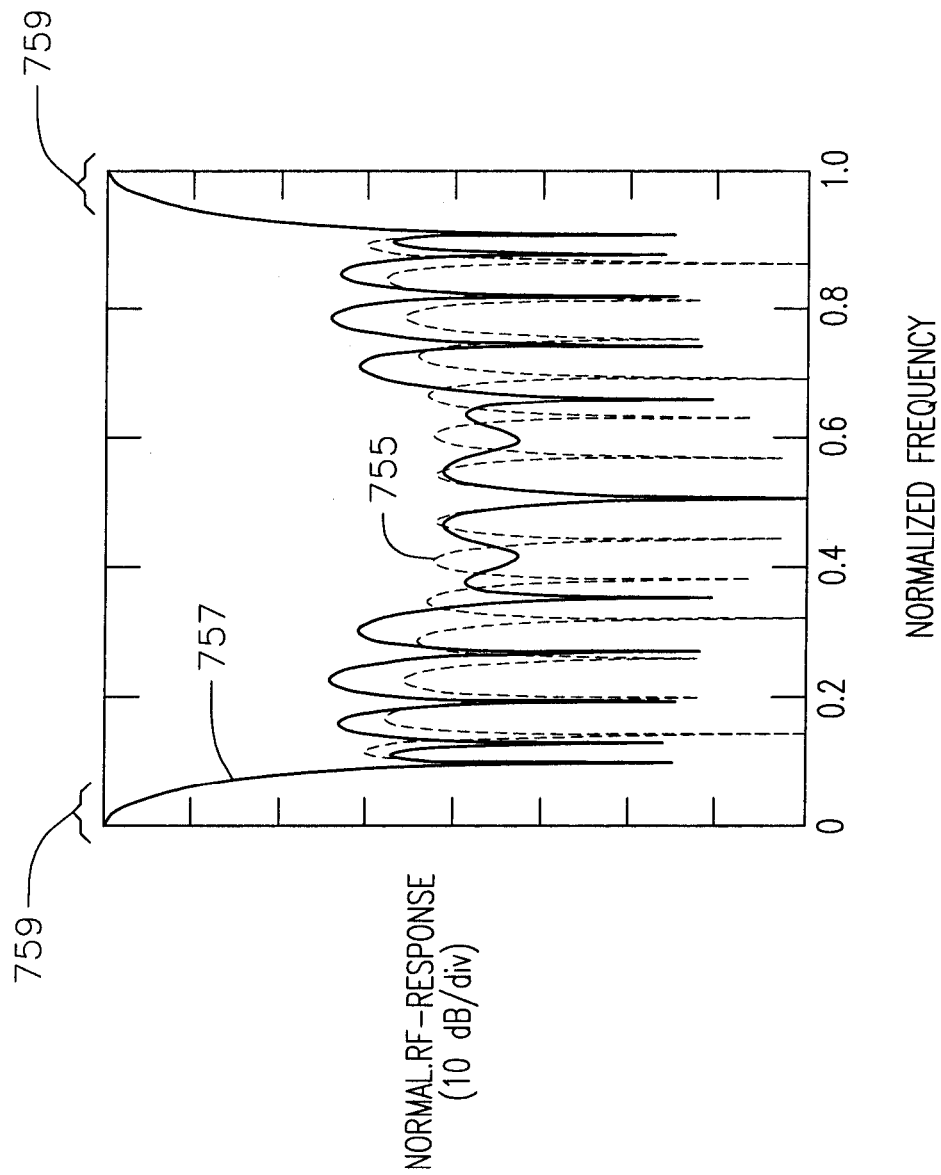
FIG. 7B shows a comparison between responses of a low pass filter formed from the exact coefficients of FIG. 7A and a low pass filter formed from the approximate coefficients of the embodiments of the invention.

FIG. 7B shows frequency response of low pass filters formed from the coefficients of FIG. 7A. Normalized frequency is shown on the horizontal axis and normalized frequency response is shown on the vertical axis. The exact frequency response 755 obtained from theoretical coefficients is shown in dotted line and the frequency response 757 derived from the approximate coefficients is shown with the solid curve. The simulated frequency responses 757 for low-pass filters obtained from the approximate tap weights derived from the approach of the embodiments of the invention (solid-line) may be compared against the frequency responses 755 for low-pass filters obtained from precise or theoretical tap coefficients (dotted curve). As shown by coinciding curves in the passband areas 759, the same passband width $\Delta f$ was obtained for both theoretical and approximate cases. In addition, a relatively high SLSR of approximately 26 dB was achieved for the extrapolated tap weights, which was only a degradation of approximately 5 dB from the filter formed using precise filter coefficients. These simulations illustrate that the extrapolation scheme described in this invention disclosure is a viable approach for enlarging the number of filter taps in RF photonic transversal filters based on the Dolph Chebyshev functions.

Embodiments of this invention describe an approach for implementing a large number of taps for an RF photonic transversal filter that utilizes tap apodization and wavelength division multiplexed (WDM) technologies in its formation. A filter architecture where each tap for synthesizing the filter response is derived from one input wavelength is improved by the embodiments of the invention that obtain several taps from one wavelength by wavelength reuse schemes. To accomplish a higher degree of passband reconfigurability, it is desirable to develop FIR filters that could generate multiple filter taps from each input wavelength $\lambda$. Embodiments of the invention describe a WDM filter architecture where a selected subset of the input wavelengths is utilized to generate multiple taps per wavelength. Furthermore, this generation of multiple taps per wavelength is designed to preserve the high SLSR achieved with common apodization schemes. Using embodiments of the disclosed invention, one can reconfigure the filter passband, especially its width, with a high degree of variability by changing the number of taps, while preserving a high SLSR for the filter response.

Although the present invention has been described with reference to certain exemplary embodiments, it is understood that a variety of modifications and variations may be made to the present invention without departing from the spirit or scope of the invention defined in the appended claims, and their equivalents.

What is claimed is:

1. A method for photonic transversal filtering of an input RF signal comprising:
   receiving a plurality of single frequency optical waves and the input RF signal;
   modulating amplitudes of the single frequency optical waves by the input RF signal;
   introducing primary time delays between the modulated single frequency optical waves having different frequencies;
   filtering the modulated and delayed single frequency optical waves to generate a subset of single frequency optical waves;
   splitting the subset of single frequency optical waves into a plurality of branches, each of the branches comprising the subset of single frequency optical waves; and
   attenuating an amplitude of at least one single frequency optical wave of the subset of single frequency optical waves.

2. The method of claim 1, further comprising introducing different secondary time delays respectively to the branches, the subset of single frequency optical waves in each of the branches being delayed by a corresponding one of the different secondary time delays, and the subset of single frequency optical waves being previously separated by the primary time delays.

3. The method of claim 2, wherein the secondary time delays comprise different time delays.

4. The method of claim 2, further comprising converting the plurality of single frequency optical waves into electrical signals for producing a filtered output RF signal corresponding to the input RF signal, and modifying polarities of the groups of the subset of single frequency optical waves separated by the secondary time delays.

5. The method of claim 2, further comprising varying the attenuation of the amplitude of the at least one single frequency optical wave of the subset to form a transfer function selected from the group consisting of a sinc window, a Dolph-Chebyshev window, a Hamming window, and a Gaussian window.

6. The method of claim 2, further comprising varying the secondary time delays between the groups of the subset.

7. The method of claim 1, wherein the introduction of the primary time delays leaves the amplitudes of the single frequency optical waves substantially unchanged.

8. A method for photonic transversal filtering of an input RF signal comprising:
receiving a plurality of single frequency optical waves and the input RF signal;
modulating amplitudes of the single frequency optical waves by the input RF signal;
introducing primary time delays between the modulated single frequency optical waves having different frequencies;
filtering the modulated and delayed single frequency optical waves to generate a subset of single frequency optical waves;
attenuating an amplitude of at least one single frequency optical wave of the subset of single frequency optical waves;
splitting the subset of single frequency optical waves into a plurality of branches, each of the branches comprising the subset of single frequency optical waves; and
converting the single frequency optical waves into electrical signals for producing a filtered output RF signal corresponding to the input RF signal.

* * * * *